No. 12,750. REISSUED FEB. 11, 1908.

W. HAMILTON, DEC'D.

NATIONAL CASKET COMPANY, A CORPORATION OF NEW YORK, ASSIGNEE.

FACE PLATE FOR BURIAL CASKETS.

APPLICATION FILED DEC. 18, 1907.

WITNESSES
Norris Perry
Samuel L. Alpert.

INVENTOR
Wm Hamilton
BY
Duell, Warfield & Duell
ATTORNEYS

UNITED STATES PATENT OFFICE.

NATIONAL CASKET COMPANY, OF ONEIDA, NEW YORK, A CORPORATION OF NEW YORK, ASSIGNEE OF WILLIAM HAMILTON, DECEASED.

FACE-PLATE FOR BURIAL-CASKETS.

No. 12,750. Specification of Reissued Letters Patent. Reissued Feb. 11, 1908.

Original No. 619,567, dated February 14, 1899, Serial No. 661,782. Application for reissue filed December 18, 1907. Serial No. 407,092.

*To all whom it may concern:*

Be it known that WILLIAM HAMILTON, deceased, late of Allegheny, in the county of Allegheny and State of Pennsylvania, invented a new and useful Improvement in Face-Plates for Burial-Caskets, (for which Patent No. 619,567 was granted to the NATIONAL CASKET COMPANY as assignee of said Hamilton, deceased,) of which the following is a full, clear, and exact description, reference being had to the accompanying drawings, forming part of this specification, in which—

Figure 1:
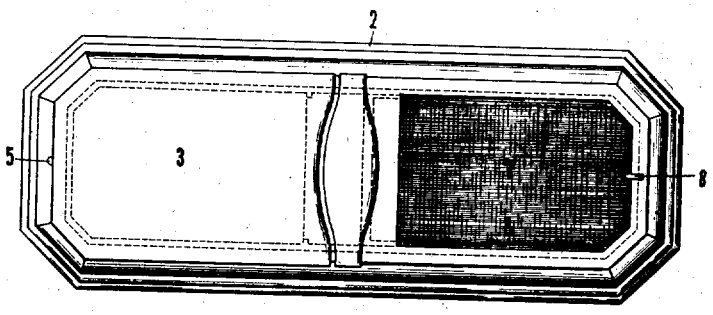
Figure 2:
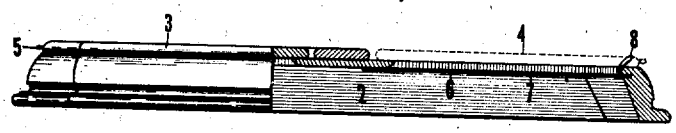
Figure 3:
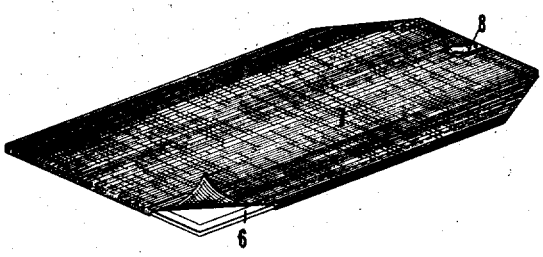

Figure 1 is a top plan view of a cover for a burial-casket provided with a face-plate constructed in accordance with my invention. Fig. 2 is a side elevation of the same, partly broken away; and Fig. 3 is a detail perspective view of the sliding panel is employed.

The invention relates to face-plates for burial-caskets and is designed to do away with the difficulties arising from the use of glass plates or panels commonly used therein. Where these glass panels are employed they are liable to become broken in the course of transportation of the casket and in falling deface the features of the corpse. Moreover, when such caskets are exhumed it is often found that the swelling of the wood of which the cover is composed has broken the glass panel.

The invention overcomes these difficulties; and it consists in providing the casket with a frame over which is stretched a strip of transparent gauze. This non-brittle fabric takes the place of the glass now ordinarily used.

In the drawings, 2 represents the cover of a burial-casket, which may be of any ordinary form and preferably provided with two removable panels 3 and 4, which are held in place by the usual catches 5, securing them removably to the cover. Beneath the panel at the head end of the cover is provided a sliding frame 6, which may be formed of metal or wood and is guided in suitable slots at the sides of the opening. Over this frame is stretched a layer 7 of transparent yielding non-brittle gauze preferably silk. The frame may be slid back when desired by means of a cord 8, secured at one end of the sliding frame. There is thus provided a simple unitary face-plate comprising a frame and gauze stretched over the same and secured thereto.

By the use of gauze, glass, with its well-known defects among which may be noted, reflection of light, distortion of vision, accumulation of moisture, and the likelihood of breaking, is done away with. The remains are clearly visible, with a desirable softening of outline, insects are excluded, yet free ventilation permitted, and the objectionable element of isolation due to the interposition of a tangible member is much reduced.

By the use of the frame there is provided an element from which the gauze is evenly supported along each of its edges and upon which it may be smoothly and tightly stretched without danger of tearing. The frame, and more particularly the slidable frame, permits the gauze to be instantly removed or placed in position and handled as a unit. The plates may be kept in stock, materially reducing the time required to dress the individual casket and permitting ready replacement in the event of breaking or tearing. No tacks are depended upon, with their tendency to tearing and uneven stretching, no plaits or folds are required with corresponding obstruction to vision, and in the sliding form of plate there is no tendency to bend the same in opening with the chance of tearing or slackening the gauze.

The gauze, properly stretched and mounted, possesses advantages so marked as to prohibit the use of any substitute under any conditions, and the frame, is the means whereby the use of gauze is rendered practical and the realization of its many advantages permitted. It is in the combination of these elements as herein set forth that my invention lies.

It is to be noted that my invention is specifically directed to the use of gauze, and this term is used throughout with its generally accepted meaning as denoting a thin gossamer-like substance of silky texture and fine weave and practically invisible in use, as distinguished from a cruder, coarser fabric.

Having described the invention, what is claimed as new and desired to be secured by Letters Patent, is:—

1. The combination with a burial casket cover portion, of a relatively movable face-plate comprising a supporting member, and a stretched sheet of transparent, non-brittle gauze mounted upon said supporting member.

2. The combination with a burial casket cover portion, of a face-plate which comprises a frame and a sheet of transparent, non-brittle gauze evenly stretched to said frame and held thereby along each edge, whereby it is uniformly supported and may be handled as a unit.

3. The combination with a burial casket cover portion, of a face-plate slidably mounted thereon which comprises a frame and a sheet of transparent, non-brittle gauze evenly stretched to said frame and held thereby along each edge, whereby it is uniformly supported and may be handled as a unit.

4. In constructions of the class described, in combination, a casket cover, a frame movably mounted upon said casket cover, and a sheet of gauze evenly stretched over and secured to said frame, whereby it is supported and held in position throughout each edge.

5. In constructions of the class described, in combination, a casket cover provided with guiding slots, and a face-plate slidably mounted within said slots, said face-plate comprising a frame and a sheet of transparent gauze evenly stretched over said frame along each edge and secured thereto.

Signed in the presence of two witnesses.

NATIONAL CASKET CO.,
By LEO STEIN,
*1st Vice-Prest.*

Witnesses:
R. S. BLAIR,
H. M. SEAMANS.